United States Patent [19]

Fricker

[11] Patent Number: 4,777,935

[45] Date of Patent: Oct. 18, 1988

[54] RECEIVER FOR SOLAR ENERGY

[75] Inventor: Hans Fricker, Rickenbach-Attikon, Switzerland

[73] Assignee: Sulzer Brothers Limited, Winterthur, Switzerland

[21] Appl. No.: 5,477

[22] Filed: Mar. 23, 1987

Related U.S. Application Data

[60] Division of Ser. No. 824,717, Jan. 31, 1986, which is a continuation of Ser. No. 608,240, May 8, 1984, Pat. No. 4,683,872.

[30] Foreign Application Priority Data

May 9, 1983 [CH] Switzerland .......................... 2515/83

[51] Int. Cl.⁴ ................................................ F24J 2/26
[52] U.S. Cl. ..................................... 126/449; 126/438
[58] Field of Search ............... 126/449, 451, 438, 422, 126/441, 424

[56] References Cited

U.S. PATENT DOCUMENTS

| | | | |
|---|---|---|---|
| 4,144,871 | 3/1979 | Porter | 126/449 |
| 4,262,657 | 4/1981 | McCullough et al. | 126/449 |
| 4,323,053 | 4/1982 | McCullough et al. | 126/449 |
| 4,367,727 | 1/1983 | Llorach | 126/449 |
| 4,394,859 | 7/1983 | Drost | 126/438 |

FOREIGN PATENT DOCUMENTS

| | | | |
|---|---|---|---|
| 2649807 | 5/1978 | Fed. Rep. of Germany | 126/449 |
| 8102154 | 12/1982 | Netherlands | 126/449 |

*Primary Examiner*—Samuel Scott
*Assistant Examiner*—Noah Kamen
*Attorney, Agent, or Firm*—Kenyon & Kenyon

[57] ABSTRACT

The receiver has fibrous material in the form of hanging wires or knitted metal mats in the entry of the duct to absorb radiant energy. A cooling medium, such as air, is passed over the fibrous material to cool the material and convey heat into the duct for subsequent use.

8 Claims, 2 Drawing Sheets

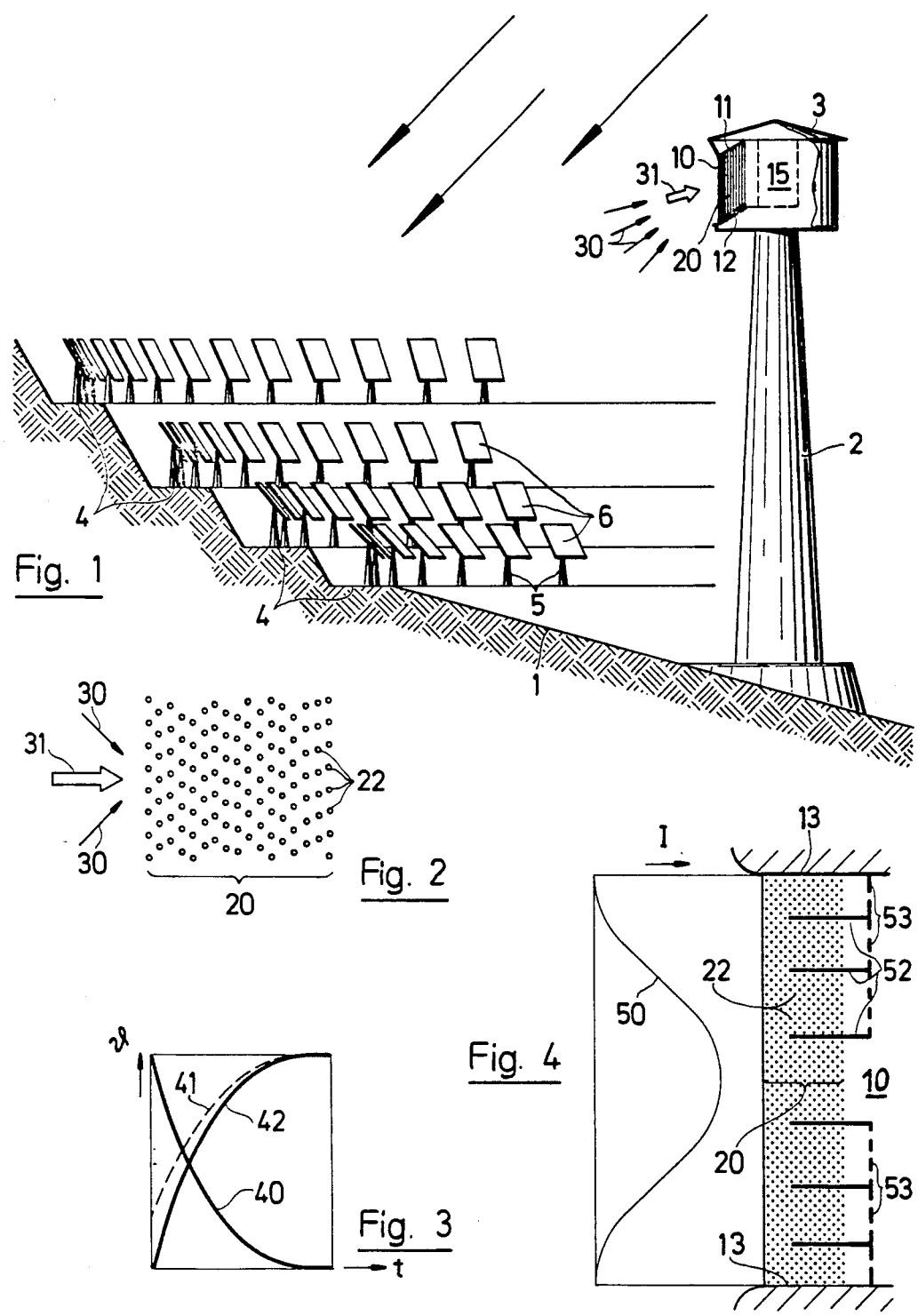

RECEIVER FOR SOLAR ENERGY

This is a division of application Ser. No. 824,717 filed Jan. 31, 1986, which is a continuation of application Ser. No. 608,240, filed May 8, 1984 now U.S. Pat. No. 4,683,872.

This invention relates to a receiver for solar energy. As is known, various types of receivers have been known for receiving and converting the energy of concentrated soar radiation. One known construction, for example, has been disposed on a tower which receives solar radiation by way of an array of adjustable mirrors. In this case, the receiver has been provided with a heat exchange surface in the form of a plurality of tubes through which a heat-receiving medium is conveyed. Such a receiver provides for a high rate of heat transfer and, thus, the walls of the tubes experience a high temperature difference. However, considerations of strength and of heat stressing of the tube walls make it impossible to heat the tube material to very high temperatures. As a result, the heat-receiving medium which also acts as a coolant for the tube walls cannot be heated to very high temperatures either. Accordingly, receivers of this type of construction have been relatively low-efficiency converters of solar energy.

Accordingly, it is an object of the invention to provide a receiver for converting the energy of concentrated solar radiation which can operate at relatively high temperatures.

It is another object of the invention to provide a solar radiation receiver of relatively high efficiency.

It is another object of the invention to transfer a relatively large amount of heat to a cooling medium passing through a solar radiation receiver.

Briefly, the invention provides a receiver for solar energy which is comprised of a duct having an entry for receiving radiant solar energy, fibrous absorber material which defines a loose structure within the duct entry in order to absorb radiant energy and means connected to the duct for conveying a cooling medium, such as air, through the loose structure to absorb heat therefrom.

During operation, solar radiation is absorbed through a considerable depth of the fibrous material used for the loose structure. Given appropriate air speeds, a considerable heat transfer takes place by way of the relatively thin fibers of the loose structure. As a result, the fibers can be heated to a temperature relative to the cooling air which is of the order of magnitude of 400° K. at the duct entry where the full radiation is incident and which decreases towards zero with increasing structure depth, i.e., with increasing air temperature. Consequently, the maximum temperature of the material of the loose structure never rises greatly above the maximum temperature of the air.

One particular advantage of the receiver is that there is a very reduced mechanical stressing of the material of the loose structure. Thus, the receiver can readily provide air temperatures of 1,000 degrees C., and more, without any great materials problems.

The fibrous material may be made up of a plurality of heat resistant wires with the wires vertically disposed so that the cooling medium passes horizontally around the wires. This insures that there is very little mechanical stressing of the wires. Alternatively, the fibrous material may be comprised of knitted metal mats. This has the advantage of greatly reducing vibrations and oscillations of the structure.

If the solar radiation inpinges at different intensities across the cross-section of the duct, use may be made of restricting means within the duct entry for channeling the flow of cooling medium therethrough. This permits greater mass flows of the cooling medium in zones of relatively high radiation density than in zones of relatively low radiation density. Further, the fibrous material may have a variable density across the duct entry to effect greater mass flows in the zones of relatively high radiation density than in the zones of relatively low radiation density. Still further, the fibrous material may have a finer cross-section in the zones of relatively high radiation density than in the zones of relatively low radiation density. These various features ensure that the final temperature at the exit from the duct is very uniform over the cross-section of the duct.

In order to further even out the final temperature of the air flowing from the duct, a plurality of walls may extend within the duct entry in order to subdivide the entry into a plurality of parallel flow paths for the cooling medium. In addition, adjustable flow restricting means may be disposed in these flow paths about the periphery of the duct. Still further, temperature detectors may be disposed downstream of the fibrous material in the flow paths for sensing the temperature of the cooling medium with each detector being connected to a respective restricting means for adjusting the restricting means in dependence upon a deviation of a sensed temperature from a set value.

Where use is made of the restricting means, at least one of the restricting means is disposed and maintained in a fully open position. This permits a very reduced pressure drop to be obtained through the fibrous structure.

In another embodiment, the duct may be shaped to direct cooling medium flows from a peripheral zone inwardly towards a central zone of the duct to even out temperature variations in the cooling medium flowing out of the duct.

The various structures for evening out temperature have the purpose of ensuring that the maximum temperature in the fibrous structure is, at most, only slightly in excess of the average final temperature of the cooling air.

These and other objects and advantages of the invention will become more apparent from the following detailed description taken in conjunction with the accompanying drawings wherein;

FIG. 1 illustrates a perspective view of a solar energy receiving system employing a receiver in accordance with the invention;

FIG. 2 illustrates a horizontal sectional view through a fibrous absorber material constructed in accordance with the invention;

Figure 5:
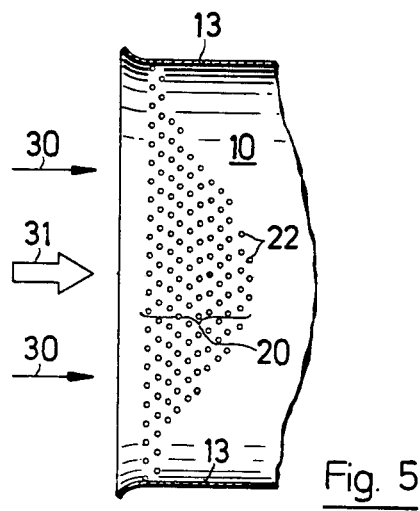
Figure 6:
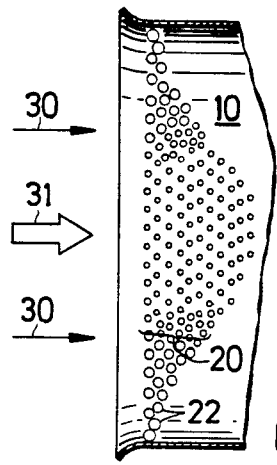
Figure 7:
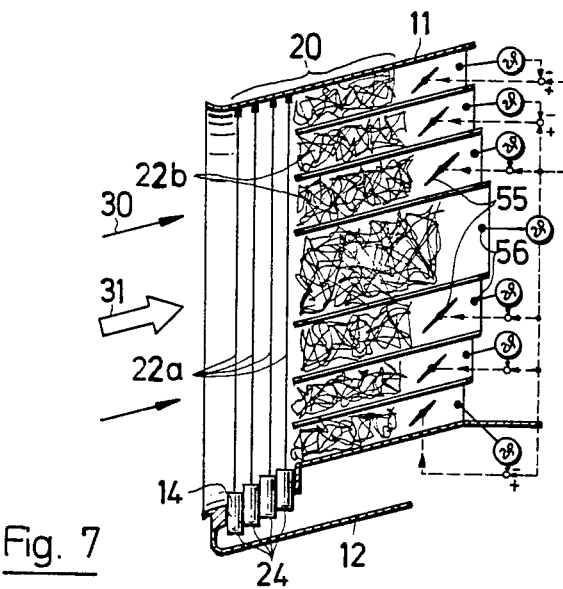
Figure 8:
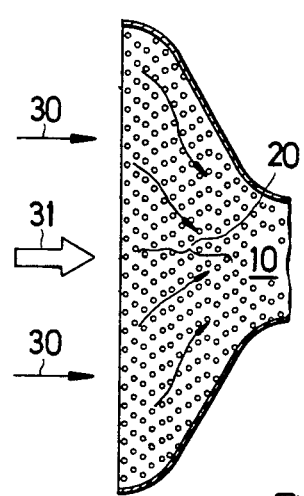
Figure 9:
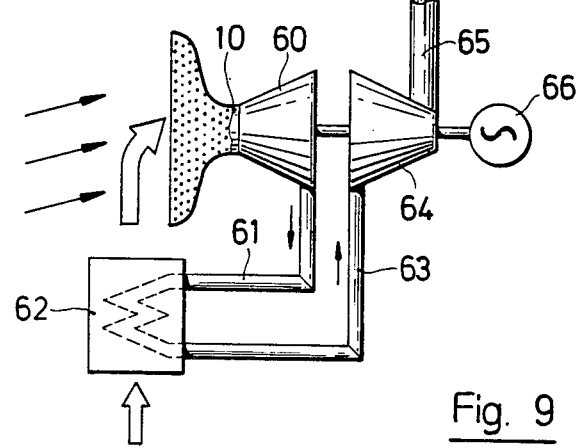

FIG. 3 graphically illustrates the radiation intensity, air temperature and structure temperature plotted against structure depth;

FIG. 4 illustrates a part cross sectional view of a duct entry constructed in accordance with the invention;

FIG. 5 illustrates a modified duct entry in accordance with the invention;

FIG. 6 illustrates a further modified duct entry employing different sized wires in accordance with the invention;

FIG. 7 illustrates a vertical sectional view through a modified duct entry in accordance with the invention;

FIG. 8 illustrates a horizontal sectional view through a further modified duct entry in accordance with the invention; and FIG. 9 diagramatically illustrates a receiver constructed in accordance with the invention for converting collected solar energy into electricity.

Referring to FIG. 1, the solar energy receiver system is disposed within a concave piece of terrain 1 and employs a tower 2 having a top section 3 as well as an array of mirrors 6. As indicated, the mirrors 6 are mounted for rotation on supports 5 which are, in turn, disposed on terraces 4 arranged in arc-fashion concentrically of the tower 2. Each mirror 6 measures one meter square. Suitable servomotors (not shown) are provided to adjust the mirrors 6 continuously so that incident solar radiation is reflected onto a defined area in the top section, for example, inside an open entry of a duct 10 of a receiver.

The duct 10 includes a top wall 11, a bottom wall 12 and a pair of side walls 13 (not shown in FIG. 1). In addition, the duct 10 is connected to a means 15 for conveying a cooling medium, such as atmospheric air, through the duct 10 for ejection through various flow cross-sections (not shown).

The receiver also has a fibrous absorber material defining a loose structure 20 within the duct entry and directly exposed to the mirrors 6 for absorbing radiant energy from the incident solar radiation reflected from the mirrors 6. This loose structure 20 is disposed in the path of the cooling medium which is passed through the duct 10, for example via suction.

Referring to FIG. 2, the structure 20 which is shown in a greatly enlarged horizontal cross-section comprises a plurality of vertically hanging wires 22 made of a heat-resistant metal and having a diameter of, for example, one millimeter. Each wire 22 is secured at the top end to the duct wall 11 and each carries a hanging weight 24 at the lower end in the manner of a plumb line (see FIG. 7). The weights 24 define a hanging floor above the duct wall 12 and contact one another laterally in order to space the wires 22 from each other.

As shown in FIG. 7, the front row of weights 24 touches an edge 14 which bridges a gap between the weights 24 and bottom wall 12.

As indicated in FIG. 2, the wires 22 are in staggered relationship to one another. However, the stagger is not uniform but is such that no straight continuous lanes form between the wires. Solar radiation which is incident on the structure in the direction indicated by the arrows 30 can therefore penetrate into, but not through, the structure 20.

Air is supplied through the structure 20 as indicated by the arrow 31 in FIGS. 1 and 2 with the air cooling the wires 22 while being heated in a heat transfer relationship.

Referring to FIG. 3, the pattern of intensity of solar radiation entering the structure relative to the depth t of the structure is defined by a falling curve 40. The intensity of the entering radiation decreases asymptotically and is converted into heat by way of the wires 22 so that the wires 22 are heated. The air flow through the structure 20 removes heat so that the wires 22 take on a temperature which, on average, corresponds to the ascending curve 41. The average air temperature plotted against the depth t is represented by the rising curve 42.

As will be apparent from FIG. 3, the first rows of wires 22 are at a relatively low temperature since they are throughly cooled by the air which is still cool upon passing by. Re-radiation from the structure 20 to the surroundings is correspondingly low so that the radiation absorption of the receiver is very high. As can be seen in FIG. 3 the temperature loading of the wires 22 remains close to the maximum air temperature and exceeds this temperature very slightly, if at all.

Of note, the material required for the first rows of wires 22 can be less temperature-resistant than the material used for the subsequent rows.

Referring to FIG. 4, wherein the loose structure 20 is shown in its complete lateral extent, the pattern of the intensity I of the incident solar radiation is represented by a curve 50 in front of the loose structure 20. Because of the finite extent of the sun and of the mirrors 6, and because of unavoidable scatter, the pattern of incident radiation resembles a portion of a sinusoidal curve. In order to achieve a very uniform temperature distribution at the exit from the structure 20, a plurality of walls 52 extend with and subdivide the duct entry into a plurality of parallel flow paths for the cooling medium. In addition, flow restricting means in the form of perforate plates 53 are disposed in the flow paths about the periphery of the duct 10. As indicated, the plates 53 have different perforation cross-sections from the outer periphery toward the center of the duct 10 in order to provide different amounts of restriction in the respective flow paths. The central flow path is, however void of any perforate plate.

The perforate cross-sections of the plates 53 are such that the mass flow of cooling air referred to the flow cross-section of the duct 10 is proportional to the radiation intensity incident on the particular flow path concern. That is, greater mass flows of the cooling medium occur in zones of relatively high radiation density than in zones of relatively low radiation density. As a result, the temperature differences over the cross-section of the duct 10 is maintained at a minimum at the exit of the duct 10. Of note, the flow paths may be subdivided not only horizontally but also vertically.

Referring to FIG. 5, in another embodiment, in order to make the exit temperature uniform, the spacing between the wires 22 may be less near the duct walls than at the duct center so that the flow resistance at the duct edge is greater than at the center. In this event, fewer wires per unit of duct width are needed near the edge of the duct than at the center.

Referring to FIG. 6, in order to increase flow resistance near the edges of the duct, thicker wires can be used at the edges than at the center.

Referring to FIG. 7, the loose structure 20 is provided by vertically hanging wires 22a as well as knitted metal mats 22b. In addition, the mats 22b are supported on component duct walls 54 which are illustrated as being slightly inclined to a horizontal plane. In addition, adjustable flow restricting means 55 are disposed in the flow paths defined between the component duct walls 54 except for the central flow path. These restricting means 55 are in the form of flaps which are controlled by temperature detectors 56 located down stream of the loose structure 20 and in the respective flow paths. As indicated in FIG. 7, a temperature sensor 57 is also disposed in the central duct downstream of the fibrous mat 22b therein so as to sense the air exit temperature threat as a set or reference value. This set value is compared with the individual values obtained by the individual temperatures detectors 56 for the respective flow paths so as to bring about an adjustment of the flap therein so as to obtain a substantially even air exit temperature across the cross-section of the duct 10.

Of note, if a restricting means is provided in the central duct, such may be disposed and maintained in a fully open position.

Referring to FIG. 8, the duct 10 may be shaped to direct cooling medium flows from a peripheral zone inwardly towards a central zone in order to even out temperature variations in the cooling medium flowing through the duct 10. For example, the duct 10 can be drawn-in in trumpet-fashion near the loose structure 20 so as to even out temperature variations in the cooling medium, conveniently, the lateral and/or depth distribution of the wires or fibers increases in the air flow direction.

The flow of hot air which is produced in the receiver can be used for various process purposes. For example, a material in powder form which is to be altered chemically by heating can be placed in the air stream and thereafter separated after heating. In this case, the means for conveying the air through the structure 20 can take the form of a connecting chimney in which the hot air is able to rise. The process can then be carried out in the chimney or at an upper end of the chimney. Advantageously, particles of the substance to be treated can be dropped through the chimney or a fluidized bed can be formed in the chimney of the particles.

The energy obtained from the receiver may also be converted into mechanical or electrical energy, for example as indicated in FIG. 9. To this end, the duct 10 is connected to a gas turbine 60 which extends into a vacuum. An outlet of the turbine is, in turn, connected via a line 61 to an air cooler 62. The air which is cooled in the cooler 62 and which may be at sub-atmospheric pressure then passes through a line 63 to a compressor 64 which has an outlet connected to a chimney 65. The turbine 60 and compressor 64 are disposed on a common shaft on which a generator 66 is disposed. The air cooler 62 is so placed that at least some of the cooling air arrow 31 which is heated therein flows to the entry of the duct 10 as indicated. Further, compressed air can be supplied to the entry of the duct 10 rather than to the chimney 65. Further, the waste heat of the compressed air can, if required, be used as process heat.

The invention thus provides a receiver for solar energy which is able to absorb a relatively large amount of radiant energy while at the same time being effectively cooled in an efficient manner. The invention further provides a receiver which is able to efficiently convert solar radiation into useful energy in a relatively efficient manner.

What is claimed is:

1. A receiver for solar energy comprising
a duct having an entry for receiving radiant solar energy in a pattern to form zones of relatively high radiation density and zones of relatively low radiation density therein;
fibrous absorber material defining a loose structure within said duct entry to absorb radiant energy, said fibrous material having a finer cross-section in zones exposed to relatively high radiation density than in zones exposed to relatively low radiation density; and
means connected to said duct for conveying a cooling medium through said loose structure to absorb heat therefrom.

2. A receiver as set forth in claim 1 wherein said fibrous material has fibers of a finer cross-section in a central zone of said duct than in peripheral zones of said duct.

3. A receiver for solar energy comprising
a duct having an entry for receiving radiant solar energy;
fibrous absorber material defining a loose structure within said duct entry to absorb radiant energy from incident solar radiation while preventing penetration of the solar radiation therethrough;
means connected to said duct for conveying air as cooling medium through said loose structure to absorb heat therefrom;
a plurality of walls extending within and subdividing said duct entry downstream of said fibrous material into a plurality of parallel flow paths for the cooling medium;
an adjustable flow restricting means disposed in at least one of said paths; and
at least one temperature detector downstream of said fibrous absorber material and in at least one of said flow paths for sensing the temperature of the cooling medium therein, said detector being connected to said restricting means for adjusting said restricting means in dependence upon a deviation of a sensed temperature from a set value.

4. A receiver as set forth in claim 3 wherein said duct entry receives solar radiation in a pattern to form zones of relatively high radiation density and zones of relatively low radiation density therein and said fibrous material as a whole has a variable density across said duct entry to effect greater mass flows of the cooling medium in zones of relatively high radiation density than in zones of relatively low radiation density.

5. A receiver as set forth in claim 4 wherein the fibers of said fibrous material have a finer cross-section in zones of relatively high radiation density than in zones of relatively low radiation density.

6. A receiver as set forth in claim 5 wherein the fibers of said fibrous material have a finer cross-section in a central zone of said duct than in peripheral zones of said duct.

7. A receiver as set forth in claim 3 wherein said duct is shaped to direct cooling medium flows from a peripheral zone inwardly towards a central zone of said duct to even out temperature variations in the cooling medium flowing out of said duct.

8. A receiver for solar energy comprising
a duct having an open entry for receiving radiant solar energy and a flow of atmospheric air;
fibrous absorber material defining a loose structure within said duct entry to absorb radiant energy, said fibrous material having a finer cross-section in a central zone of said duct than in peripheral zones of said duct; and
means connected to said duct for conveying the flow of air as a cooling medium through said loose structure.

* * * * *

UNITED STATES PATENT AND TRADEMARK OFFICE
CERTIFICATE OF CORRECTION

PATENT NO. : 4,777,935

DATED : October 18, 1988

INVENTOR(S) : Hans Fricker

It is certified that error appears in the above-identified patent and that said Letters Patent is hereby corrected as shown below:

Column 1, line 11 "soar" should be "solar"

Signed and Sealed this

Eighteenth Day of April, 1989

Attest:

DONALD J. QUIGG

*Attesting Officer*    Commissioner of Patents and Trademarks